2,815,958
ADJUSTABLE CHUCK BEARING DEVICE

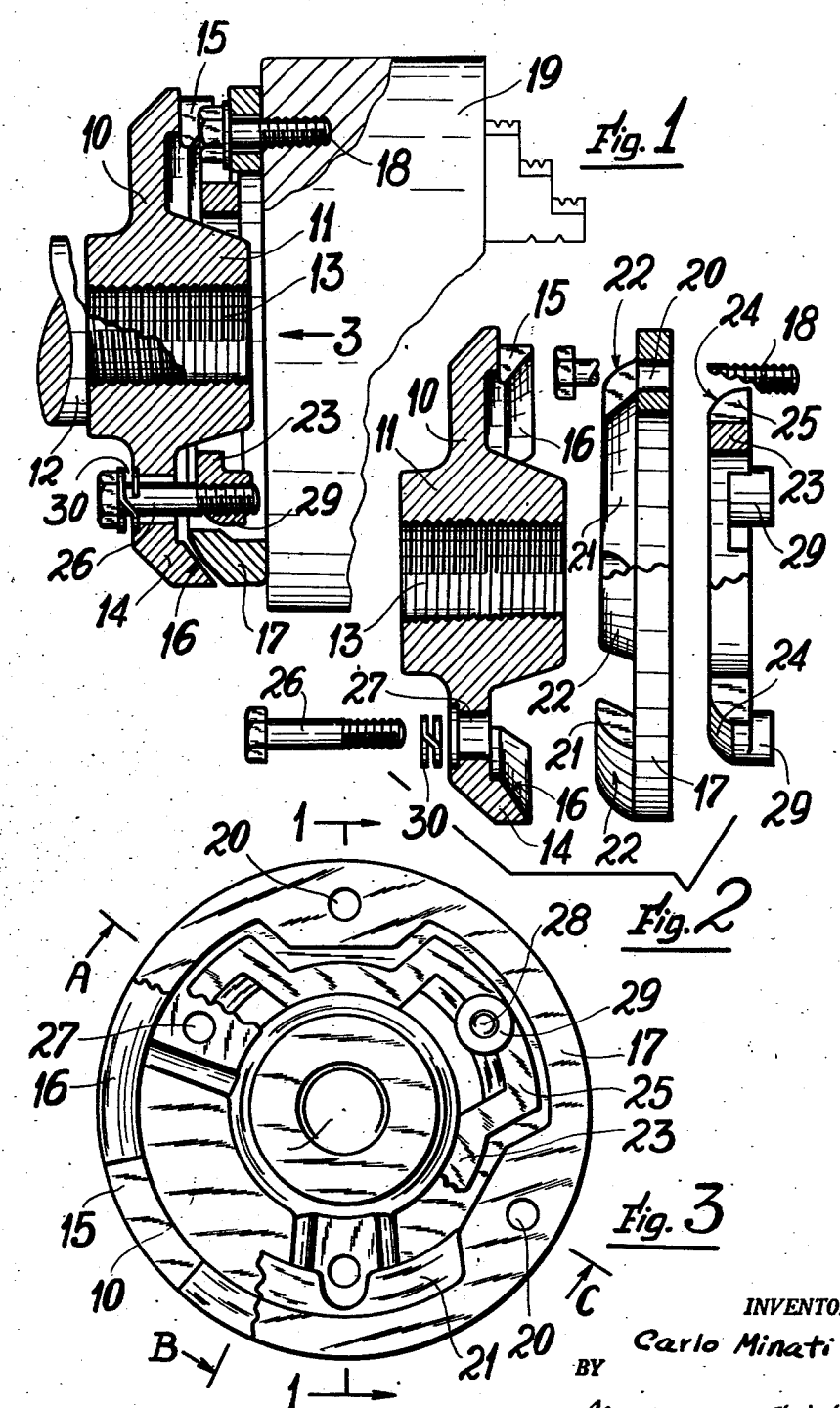

Carlo Minati, Milan, Italy

Application March 21, 1955, Serial No. 495,495

Claims priority, application Italy March 29, 1954

9 Claims. (Cl. 279—1)

This invention relates to an adjustable chuck bearing device and, more particularly, it is related to a new and useful device adapted to be made use of as a connector for having a chuck, say of a lathe or of any other machine tool in which the work may be supported and rotated by a chuck, in particular by a self-centering chuck, connected to and supported by the machine tool's chuck bearing shaft.

The main object of my present invention is to provide a chuck bearing device for the uses referred to above, and whereby the position of the said chuck may be modified in respect to the position of said shaft, for adjusting purposes, and more particularly to compensate any failure in the axial alignment of the work within the chuck clamps and therefore to adjust the axis of said work in respect to the axis of said chuck bearing shaft, i. e. in respect to the true axis which the said work is to be actually rotated during the operation of the machine tool.

It is known to those skilled in the art to which this invention appertains that very often it is not possible to have the piece of workmanship to be machined, say by a conventional lathe, readily gripped between the clamps of a conventional self-centering chuck in correct axial relationship with the axis of same chuck and/or that the chuck may not set in true co-axial relationship with the shaft by which same chuck is borne and rotated. In a plurality of practical occurrences, the said work is to be gripped by the chuck clamps about an end portion thereof not previously turned in perfect co-axial relation with the part to be machined and some adjustment is made thereby necessary before the turning operation. Said adjustment, requiring small but noticeable displacement of the work already gripped between said clamps, before tightening of the chuck, may damage the work and the chuck too, owing to the stresses to which the parts are subjected as a consequence of said displacement, which in general is performed by hammering the work, half-tightened in the chuck. Further, during the final tightening of the chuck, upon adjustment of the position of the work thereinto, other small movements of said work in said chuck may occur, and sometimes said adjustment must be repeated several times until the work is firmly kept in the chuck in the desired true co-axial position in respect to the actual axis about which said work will rotate during the machining thereof.

With the above objects in mind, my present invention, in general, mainly consists in the provision and in the application of a device comprising at least a first member adapted to be firmly and co-axially connected to the machine tool's chuck bearing shaft, in particular at the end of said shaft to which the chuck is conventionally fitted, say by a screwly engagement, a second member adapted to be firmly and co-axially connected to the chuck, in particular at the rear face thereof, the said two members involving surfaces so shaped that said members may be counterposed either in exact co-axial relationship and in any desired other relative position comprised in the range of a small angle, say from 5° to 10°, between the axis of said first member and the axis of said second member, and connecting means adapted to firmly connect the said first member to the said second member in any desired one of said relative positions comprised in said range, and adapted to have said second member set free from said first member when any modification of said relative position is desired.

My present invention further involves the application and the use of said device as a connector for having the said chuck connected to said shaft, thereby admitting any adjustment of said chuck (which is connected to said second member) in respect to said shaft (which is connected to said first member) within the said range, until the work previously and firmly gripped in and by the chuck clamps is brought in the desired axial relationship with the axis of said shaft, and the final securing of said work in the desired position in respect to said shaft, by securing said second member to said first member, making use of said connecting means of the device.

In other words, a device constructed and applied according to my present invention may be made use of as an hinge connection between the chuck and its shaft, for having the axial direction of said chuck modified, within certain limits, in respect to the axial direction of its shaft, for the purpose of the axial adjustment of the work gripped into the chuck clamps, in respect to the axis about which said work will be rotated during the machining thereof, and then as a rigid chuck bearing means, adapted to firmly bear said adjusted chuck on its shaft, in view of said machining.

Another object of this invention is to provide a new and improved adjustable chuck bearing device of the character above described, wherein means are comprised for having the said second member connected to said chuck in any desired laterally displaced position from the true co-axial relationship of said member and said chuck, i. e. a connector device adapted for either lateral and axial adjustment of the said chuck in respect to its shaft, within certain practical limits.

A further object of this invention is to provide a new and useful connector device for the use and the purpose above described, wherein the said connecting means are combined with spring or resilient means for having the said second member frictionally connected to said first member upon losing of said connecting means, and thereby adapted to prevent the said chuck to become fully free from the engagement with said shaft, the resulting frictional engagment being designed to keep said chuck in any desired position comprised in said range and at which said chuck has been brought during the adjustment steps, and therefore to allow any checking and further adjustment of said position, and eventually a preliminary rotation of the work for controlling purpose, prior to final securing of the said members together.

These and other objects and advantages of my present invention will be more fully apparent from a consideration of the following detailed description of one preferred form of embodiment thereof, as taken in conjunction with the accompanying drawing, forming an essential component of this disclosure, and wherein:

Figure 1 is a vertical sectional view, taken along line 1—1 of Fig. 3, of said preferred form of embodiment of this invention, connected to a conventional chuck and to a chuck bearing shaft, say of a lathe, said chuck and shaft being shown in fragmentary view and drafted in light lines;

Figure 2 is an exploded view of the various components of the device of Fig. 1, shown partly in same sectional view and partly in side elevation; and Figure 3 is an axial view of the device, as it may be seen from the direction indicated by arrow 3 in Fig. 1; in said Fig. 3, in the angular portion A—C of the drawing a third blocking member (which will be considered as this description proceeds) is broken away, and in the minor angular portion A—B the said second member is broken away too, for making apparent the details of the under laid members.

Referring now to the drawing: in the preferred form of embodiment shown, the said first member consists in a substantially disk-shaped metallic body 10 having an axially extended hub portion 11 provided with an axial threaded opening 13 in which the end portion of the shaft 12 of a conventional machine tool (not shown), say a lathe, may be screwly and firmly engaged. It is obvious that the said hub portion 11 may be differently dimensioned and/or shaped, and/or provided with differing means for connection thereof to the end portion of said shaft, accordingly with the type, the shape and the size of the shaft with which machine tool is provided and to which the device according to the invention is designed to fit.

Said disk-shaped body 10 is provided with a flared outer portion 14 made integral therewith and including an inwardly and forwardly directed frusto-conical surface 16, interrupted by spacings 15. As this description proceeds and in the wording of the appended claims, the expressions "front" and "rear," and likewise "forwards" and "rearwards" will mean a position and respectively a direction facing and respectively directed to the chuck, and vice-versa, respectively. Said body 10 is further provided with holes 27 (Figs. 2 and 3) evenly spaced about its outer portion. Preferably but not exclusively the said body will be provided with three holes 27 and with three spacings 15, and likewise the various details of other members and parts of the device hereinafter described will be provided with three folds repeated details, in even angular spaced relationship, as shown.

The said second member consists in an annular metallic body 17 having a flat front face adapted to be juxtaposed against the rear face of a conventional chuck 19, and provided with a plurality of holes 20 evenly spaced about the outer zone of said body, and adapted to be traversed by bolts 18 designed to firmly connect said second member to said chuck against the rear face thereof. Preferably, the diameter of said holes 20 is noticeably greater than the diameter of the stem portion of said bolts 18 and smaller than the diameter of the head portion of same bolts, so that said chuck may be firmly secured to said second member in any laterally displaced relative position comprised within the limits defined by the difference between the said diameters of holes 20 and of stem portions of bolts 18. A small difference of said diameters, say from 1/10 to 1/20 of an inch, may be enough for allowing a lateral adjustment of the chuck as necessary to meet the most of practical occurrences.

Said annular body 17 is provided with and made integral to inwardly and rearwardly directed flared extensions 21, angularly developed and spaced as the said spaced portions 14 of the above described first member are, provided with inwardly and forwardly facing frusto-conical surfaces and with outwardly and rearwardly facing spherical surfaces 22 (Fig. 2), dimensioned and arranged to tangentially contact said frusto-conical surfaces 16 of the said first member of the device. As it will be readily understood from what above, said contacting relationship may be mantained even though the two described members are relatively moved around the center of the sphere a portion of which is represented by said surfaces 22, causing said surfaces to slide on and against the opposite surfaces 16 of said first member.

The connection of said first member to the said second member is attained by axially pressing said members one against the other, and exerting a pressure enough to frictionally engage said abutting surfaces 16 and 22. In the form of embodiment shown, said frictional engagement is carried on by making use of connecting means comprising, in combination, a third member, hereinafter indicated as "blocking member," and a plurality of bolts co-operating with resilient washers. Said blocking member consists in an annular metallic body 23, provided with an outwardly and rearwardly facing spherical surfaces 24 (Fig. 2), formed about portions 25 thereof, angularly interrupted by spacings as the said portions 21 of body 17 are, and adapted to abut on and to tangentially contact with the said inner frusto-conical surfaces of said portions 21. The sphere, a few zones of which are actuated by said surface 24, is of radius like the radius of the sphere forming the surface 22 of said second member, minus the thickness of said portions 21 of the latter. Upon said provision, as the said three member are brought in axial abutting relationship, as shown in Fig. 1, the centers of both spheres partially represented by said surfaces 16 and 24 result in one point on the axis of shaft 12 and positioned about between the clamps of the chuck.

The said blocking member may be brought in abutting relationship with and pressed against the front face of said second member 17 by means of a plurality of bolts 26 traversing said holes 27 of first member 10 and having the expanded heads thereof in abutting relationship with the rear face of said body 10, through resilient washers 30, the screw-threaded stem of said bolts 26 being designed for screwly engaging with threaded holes 28 (Fig. 3) provided in suitable cylindrical extensions 29 of the body 23 of said blocking member. Obviously, the frictional relationship of said surfaces 24 of the blocking member and of the front inner surfaces of portions 21 of the second member of the device co-operates to increase the firm frictional engagement of the said first and second members, owing to the fact that the connection actuated by said bolts 26 makes the said blocking member operatively integral with the said first member of the device.

From what above and by a consideration of the accompanying drawing it will be readily understood that the device herein described may actuate a strong and firm connection between the chuck 19 and its shaft 12, the tightening of the said bolts 26 causing the said second member (firmly connected to the chuck) to be strongly pressed between the said first member (firmly connected to the shaft) and the said blocking member (firmly connected to said first member). The amplitude of the linear zones of contact between said members, extended on all surfaces 16, 22 and 24, ensures a firm connection between said co-abutting members. Said connection may be further improved, if desired, by shaping the said forwardly facing surface 16 of first member and/or the inner surfaces of portions 21, designed to abut on surfaces 24 of the blocking member, in a spherical form, so that the actual contacting linear zones will be greatly widened.

Conversely, by loosing the said bolts 26 the pressure applied by the first and by the blocking member about the second member may be released, and thereby said second member is admitted to be slidably moved between the said first and blocking members, for the adjusting purposes desired and hereinbefore set forth. In said adjustment steps, the said chuck 19 may be actually rotated in any desired direction about the said common center of the spheres partially actuated by said surfaces 22 and 24, within the limits, say from 5° to 10°, defined by the amplitude of said abutting surfaces.

Owing to the use of the said resilient washers 30, or of another equivalent resilient means, by partially loosing said bolts 26 the abutting pressure between said members may be reduced enough for admitting the relative motion thereof, for the desired adjusting purpose, imparted by a slight hammering of the chuck, for example, while the frictional engagement may be kept at a value enough for having the chuck and the work clamped thereby supported in the position imparted in said adjusting steps, for checking purpose, for example. The amplitude and the shape described of the contacting surfaces is such that the device constructed according to the invention may resist to heavy duty and it has been proved practically wear-proof in view of the frictional stresses to which said contacting surfaces are subject during the adjusting operation, even if said operation is performed while a strong pressure is still exerted on the members, and carried on by applying an excessively severe hammering on the chuck.

It will be understood that each of the elements described above, or two or more together, may also find useful application in other types of chuck bearing or chuck connector devices differing from the type described above.

While I have illustrated and described the invention as embodied in an adjustable connector for self-centering chucks originally designed to be screwly connected to the threaded end portion of the chuck bearing shaft of a machine tool, say of a lathe, I do not intend to be limited to the details shown, since various modifications and structural changes may be made without departing in any way from the spirit of my invention.

Without further consideration, the foregoing will so fully reveal the gist of my invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of this invention, as defined in and by the appended claims.

What I claim as new and desire to have protected by Letters Patent is:

1. In a connector device intended for connecting a chuck having a flat rear face to a rotatable chuck bearing shaft for the purpose described, comprising, in combination: a first member designed to be firmly connected to said shaft and consisting in a disk-shaped body adapted to be firmly connected to said shaft, and including an annular portion having an inwardly and forwardly facing frusto-conical surface; a second member designed to be firmly connected to said chuck and consisting in an annular body having an outwardly and rearwardly facing spherical surface adapted to tangentially contact said frusto-conical surface of said first member, said second member being movable between a position in axial alignment with said first member and a plurality of angularly displaced positions, said second member having inwardly and forwardly frusto-conical surfaces; and connecting means designed to press said second member on said first member in said tangentially contacting relationship, said connecting means comprising an annular blocking body member including an outwardly and rearwardly facing spherical surface adapted to tangentially contact said frusto-conical surfaces of said second member, and in a plurality of bolts connecting said blocking member to said first member.

2. In a connector device intended for connecting a chuck to a rotatable chuck bearing shaft having a fore threaded end portion, for the purpose described, comprising, in combination: a first member designed to be firmly connected to said shaft and consisting in a disk-shaped body having a threaded hub adapted to be firmly screwed to said fore end portion of the shaft, and having an inclined angularly interrupted circular outer portion including an inwardly and forwardly facing frusto-conical surface; a second member designed to be firmly connected to said chuck and consisting in an annular body having an inclined angularly interrupted inner portion including an outwardly and rearwardly facing spherical surface adapted to tangentially contact said frusto-conical surface of said first member, said second member being movable between a position in axial alignment with said first member and a plurality of angularly displaced positions, said second member having inwardly and forwardly frusto-conical surfaces; an annular blocking body member having an interrupted outer portion including an outwardly and rearwardly facing spherical surface adapted to tangentially contact said frusto-conical surfaces of said second member; and a plurality of bolts co-operating with resilient washers, and adapted to controllably keep said first, second and blocking members in the said tangentially contacting relationship, with said second member in any of said positions.

3. In a connector device intended for connecting a chuck to a rotatable chuck bearing shaft for the purpose described, comprising, in combination: a first member designed to be firmly connected to said shaft and consisting in a disk-shaped body having a hub adapted to firmly engage with said shaft, and having an inclined angularly interrupted circular outer portion including an inwardly and forwardly facing frusto-conical surface; a second member designed to be firmly connected to said chuck and consisting in an annular body having an inclined angularly interrupted inner portion including an outwardly and rearwardly facing spherical surface adapted to tangentially contact said frusto-conical surface of said first member, said second member being movable between a position in axial alignment with said first member and a plurality of angularly displaced positions, said second member having inwardly and forwardly frusto-conical surfaces and a plurality of holes evenly spaced about its annular portion; a plurality of bolts having stems undersized in respect to said holes, adapted to traverse the latter, said bolts being movable between a connecting position in which said bolts firmly connect said second member to said chuck, and a releasing position in which the chuck is released for laterally adjusting said chuck in the lateral neighbourhood of a co-axial relationship within the limits of the clearance of said stems within said second holes; an annular blocking body member having an interrupted outer portion including an outwardly and rearwardly facing spherical surface adapted to tangentially contact said frusto-conical surfaces of said second member; a plurality of bolts co-operating with resilient washers, and arranged for controllably bringing said first, second and blocking member in the said tangentially contacting relationship with said second member in any of said positions.

4. In a connector device intended for connecting a chuck having a rear flat face to a rotatable chuck bearing shaft having a fore threaded end portion, for the purpose described, comprising, in combination: a first member designed to be firmly connected to said shaft and consisting in a disk-shaped body having a threaded hub adapted to firmly screw to said fore end portion of the shaft, and having inclined angularly interrupted circular outer portion including an inwardly and forwardly facing frusto-conical surface, and being formed with a plurality of first holes evenly spaced about its disk-shaped portion; a second member designed to be firmly connected to said chuck and consisting in an annular body having front flat surface adapted to abut on the rear face of the chuck, and having an inclined angularly interrupted inner portion including an outwardly and rearwardly facing spherical surface adapted to tangentially contact said frusto-conical surface of said first member, said second member being movable between a position in axial alignment with said first member and a plurality of angularly displaced positions, said second member having inwardly and forwardly frusto-conical surfaces and being formed with a plurality of second holes evenly spaced about its annular portion; a plurality of bolts having stems undersized in respect to said second holes, adapted to traverse the latter, said bolts being movable between a connecting position in which said bolts firmly connect said second member to said chuck against the rear face thereof, and a releasing position in which the chuck is released for laterally adjusting said chuck within the limits of the clearance of said stems within said second holes; and connecting means designed to press said second member on said first member in said tangentially contacting relationship, and comprising in an annular blocking body member having an interrupted outer portion including an outwardly and rearwardly facing spherical surface adapted to tangentially contact said frusto-conical surfaces of said second member, and a plurality of bolts having each a head, a stem, and a threaded end portion, said connecting means comprising further a plurality of resilient washers respectively located on said stems of said bolts, said bolts being adapted to have their stems passed through said first holes of said first member, their heads abutting through said washer on the rear face of the latter member and their threaded portion engaged with said blocking member, for controllably bringing said first, second and blocking member in the said tangentially contacting relationship with said second member in any of said positions.

5. A chuck holder for connecting a chuck to the end portion of a shaft and comprising, in combination, a first member adapted to be rigidly connected to the end portion of the shaft; a second member adapted to be rigidly connected to the chuck, said second member having a surface abutting against a surface of said first member and being movable along said surface from a position in which the end portion of said shaft is in axial alignment with the chuck to a plurality of angularly displaced positions; first connecting means movable between a connecting position for firmly connecting said first and said second member in any of said positions of the same and an adjusting position in which said second member is released for angular adjustment relative to said first member; and second connecting means adapted to firmly connect said second member to the chuck, said second connecting means being movable between a connecting position for firmly connecting said second member to the chuck and an adjusting position in which the chuck is released for lateral displacement on said second member.

6. A chuck holder for connecting a chuck to the end portion of a shaft and comprising, in combination, a first member adapted to be rigidly connected to the end portion of the shaft; a second member adapted to be rigidly connected to the chuck, said second member having a surface abutting against a surface of said first member and being movable along said surface from a position in which the end portion of said shaft is in axial alignment with the chuck to a plurality of angularly displaced positions; and connecting means including resilient means, said connecting means being movable between a connecting position in which said resilient means are compressed for firmly pressing said surface of said second member against said surface of said first member for holding said members in any of said positions of the same and an adjusting position in which said resilient means are released for angular adjustment relative to said first member.

7. A chuck holder for connecting a chuck to the end portion of a shaft and comprising, in combination, a first disk-like member adapted to be rigidly connected to the end portion of the shaft; a second annular member adapted to be rigidly connected to the chuck, said second member having a first surface abutting against a surface of said first member and having a second surface opposite said first surface, said second member being movable along said surface of said first member between a position in which said end portion of the shaft is in axial alignment with the chuck to a plurality of angularly displaced positions; and connecting means including resilient means for pressing said first surface of said second member against said surface of said first member, said connecting means including an annular blocking member located at least partly within said second member and having a surface abutting against said second surface of said second member, and including bolt means operatively connected to said first member and said blocking member and freely transversing said second member, said bolt means movable between a connecting position in which said resilient means are compressed and said surface of said blocking member is strongly pressed against said second surface of said second member to press said first surface thereof against said surface of said first member so that said second member is firmly held between said first and said blocking member, and an adjusting position in which said blocking member and said resilient means are released for angular adjustment of said second member relative to said first member.

8. A chuck holder for connecting a chuck having a flat rear face to the end portion of a shaft and comprising, in combination, a first disk-like member adapted to be rigidly connected to the end portion of the shaft; a second annular member adapted to be rigidly connected to the chuck, said second member having a first surface abutting against a surface of said first member, and having a second surface opposite said first surface, and having also a third flat surface spaced from said first surface thereof a distance larger than said second surface, said third surface being adapted to abut against said flat rear face of the chuck, said second member being formed with a plurality of holes passing in axial direction therethrough, said second member being movable along said surface of said first member between a position in which said end portion of the shaft is in axial alignment with the chuck to a plurality of angularly displaced positions; first connecting means including resilient means for pressing said first surface of said second member against said surface of said first member, said first connecting means including an annular blocking member located at least partly within said second member and having a surface abutting against said second surface of said second member, and including bolt means operatively connected to said first member and said blocking member and freely transversing said second member, said bolt means movable between a connecting poistion in which said resilient means are compressed and said surface of said blocking member is strongly pressed against said second surface of said second member to press said first surface thereof against said surface of said first member so that said second member is firmly held between said first and said blocking member, and an adjusting position in which said blocking member and said resilient means are released for angular adjustment of said second member relative to said first member; and a second connecting means adapted to firmly connect the chuck to said second member with the rear face of the chuck abutting against said third surface of said second member, said second connecting means including a plurality of bolts, each having a head portion engaging said second member opposite said third surface thereof and each having a stem portion passing with clearance through said holes, respectively, each of said stem portions having a threaded free end adapted to be screwed into the chuck, said bolts being movable between a first position in which said second member is tightly held between said head portions and said flat rear face of said chuck and an adjusting position in which the chuck may be laterally shifted on said third surface of said second member within the limits of the clearance of said bolts in said holes.

9. A chuck holder for connecting a chuck having a flat rear face to the threaded end portion of a shaft and comprising, in combination, a first disk-shaped member adapted to be rigidly connected to the shaft, said first member having a central hub portion provided with a threaded bore adapted to be firmly threaded onto the threaded end portion of the shaft and having an outer annular portion having a concave surface; a second annular member adapted to be rigidly connected to the chuck, said second annular member having a convex surface tangentially contacting said concave surface of said first member, and having a flat surface spaced from said convex surface and adapted to abut against said flat rear face of the chuck, said second member being movable along said concave surface of said first member from a poistion in which said end portion of the shaft is in axial alignment with the chuck to a plurality of angularly displaced positions; means to firmly connect the chuck to said second member; and connecting means for pressing said convex surface of said second member against said concave member against said concave surface of said first member in any of said positions.

References Cited in the file of this patent

UNITED STATES PATENTS

| | | |
|---|---|---|
| 2,447,711 | Mikis | Aug. 24, 1948 |
| 2,497,426 | Toth | Feb. 14, 1950 |
| 2,567,498 | Strauss | Sept. 11, 1951 |